United States Patent [19]

Izukawa

[11] Patent Number: 4,954,742
[45] Date of Patent: Sep. 4, 1990

[54] VIBRATORY-WAVE MOTOR DEVICE

[75] Inventor: Kazuhiro Izukawa, Kanagawa, Japan

[73] Assignee: Canon Kabushiki Kaisha, Tokyo, Japan

[21] Appl. No.: 292,538

[22] Filed: Dec. 30, 1988

[30] Foreign Application Priority Data

Jan. 11, 1988 [JP] Japan .............................. 63-003425

[51] Int. Cl.$^5$ ......................................... H01L 41/08
[52] U.S. Cl. ..................................... 310/316; 310/323
[58] Field of Search ............... 310/316, 317, 323, 328; 318/116, 118

[56] References Cited

U.S. PATENT DOCUMENTS

| | | | |
|---|---|---|---|
| 4,513,219 | 4/1985 | Katsuma et al. ..................... | 310/328 |
| 4,560,263 | 12/1985 | Katsuma et al. ................. | 310/328 X |
| 4,660,933 | 4/1987 | Notagashira et al. ............. | 350/255 |
| 4,692,672 | 9/1987 | Okuno ............................. | 310/323 X |
| 4,713,571 | 12/1987 | Suzuki et al. .................... | 310/323 X |
| 4,794,292 | 12/1988 | Shimizu et al. .................. | 310/323 X |
| 4,794,294 | 12/1988 | Shimizu et al. .................... | 310/318 |
| 4,833,358 | 5/1989 | Suzuki et al. .................... | 310/323 X |

OTHER PUBLICATIONS

*News in Engineering,* Jan. 1966.
*News in Engineering,* Jul. 1967.

*Primary Examiner*—Mark O. Budd
*Attorney, Agent, or Firm*—Fitzpatrick, Cella, Harper & Scinto

[57] ABSTRACT

A vibratory-wave motor which forms a progressive vibratory wave with a frequency signal applied to a piezoelectric body is arranged to permit adjustment of a torque of contact with its rotor by adjusting as desired the driving frequency of the signal particularly when the motor is operated in a mode in which a stationary wave is formed instead of the progressive vibratory wave.

10 Claims, 5 Drawing Sheets

VIBRATORY-WAVE MOTOR DEVICE

BACKGROUND OF THE INVENTION

1. Field of the Invention

This invention relates to a driving circuit arranged to drive a vibratory-wave motor.

2. Description of the Related Art

Heretofore, there have been proposed many cameras of the kind using a vibratory-wave motor for driving a lens. The cameras of this kind include some arrangement for allowing the photographer to manually drive the lens in addition to an electrical driving arrangement for driving the lens by the power of the vibratory-wave motor.

The known methods for the above-stated manual lens driving arrangement include, for example, a method disclosed in Japanese Patent Application Laid-Open No. SHO 59-101608. According to this method, a stationary vibratory wave is generated by electro-mechanical energy converting means to bring frictional contact between a stationary body and a vibrating body into a kinetic state of friction during the manual lens driving process. This method reduces not only the coefficient of friction but also the area of contact, and thus permits the manual lens driving operation to be lightly accomplished without necessitating any complex structural arrangement.

However, the above-stated conventional manual driving method does not enable the photographer to directly select and change the rotating torque of the lens during the manual operation. Besides, in accordance with this method, a stationary wave must be constantly generated. Therefore, this method necessitates an incessant current flow even while the lens is not rotated. This increases electric energy consumption. It has been another problem with the prior art method that, in order to make the rotating torque of the lens variable, the camera must have some additional rotation torque changing means connected to the vibratory-wave motor.

SUMMARY OF THE INVENTION

One aspect of the invention under the present application resides in the provision of a motor driving device which is highly advantageous for driving a lens by means of a vibratory-wave motor and is arranged to have the state of friction between the rotor and the stator of the motor variable as desired in changing the mode of the vibratory-wave motor into a stationary wave driving mode.

Another aspect of the invention is the provision of a motor driving device which is arranged to detect a phase difference between a driving signal applied to a vibratory-wave motor and a monitor signal indicative of the driving state of the motor; and to change the state of friction between the rotator and the stator of the motor as desired by adjusting the frequency of the driving signal in such a way as to have the detected phase difference coincide with an arbitrarily set phase difference.

The above and other aspects or objects and features of the invention will become apparent from the following detailed description of embodiments thereof taken in connection with the accompanying drawings.

DETAILED DESCRIPTION OF THE PREFERRED EMBODIMENTS

Figure 1:
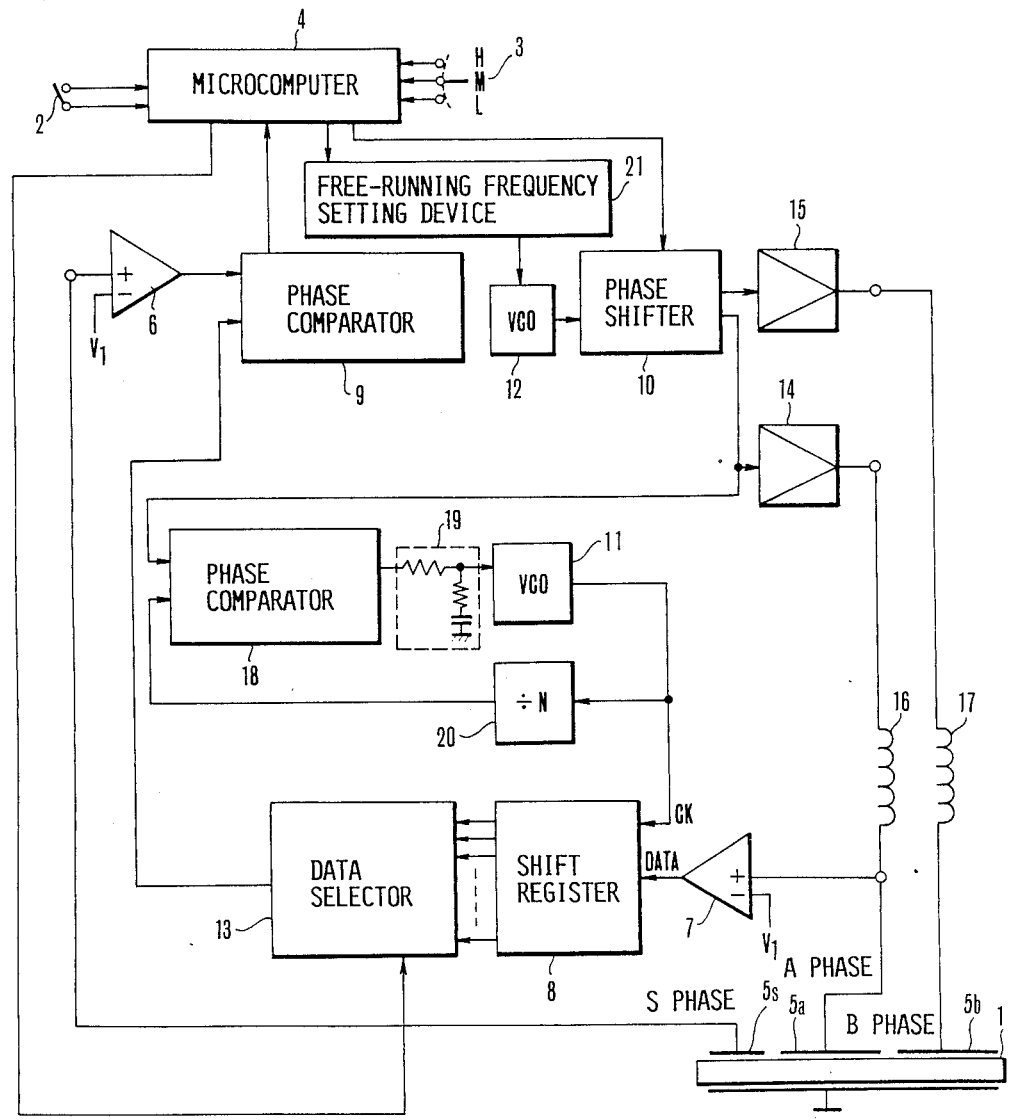
FIG. 1 is a circuit diagram showing a driving device for a vibratory-wave motor which is arranged as an embodiment of the invention.

FIG. 1 shows by way of example an embodiment of this invention. The illustration includes a stator 1 of a vibratory-wave motor; a switch 2; a torque setting switch 3; and a microcomputer 4. The microcomputer 4 is connected to the switch 2, the torque setting switch 3 and an edge trigger type phase comparator 9 and is arranged to receive their outputs. Further, the microcomputer 4 is connected also to a data selector 13, a free-running frequency setting device 21 and a phase shifter 10 and is arranged to control them. A voltage-controlled oscillator (hereinafter referred to as VCO) 12 is arranged to oscillate at a frequency corresponding to an input voltage. The free-running frequency of the VCO 12 is set by the free-running frequency setting device 21. Reference numerals 14 and 15 denote amplifiers, and 16 and 17 denote matching coils. The coil 16 is arranged as follows: A frequency signal produced by the VCO 12 passes through the phase shifter 10 to be applied, via the amplifier 14 and the matching coil 16, to an A phase electrode 5a provided on the stator 1 of the vibratory-wave motor. The other matching coil 17 is likewise arranged as follows: The frequency signal produced by the VCO 12 passes through the phase shifter 10 to be applied, via the amplifier 15 and the matching coil 17, to a B phase electrode 5b provided on the stator 1.

A comparator 7 is arranged to shape the wave form of the output of the amplifier 14 obtained via the coil 16 (the same wave form as a voltage wave form applied to the stator 1) into a rectangular pulse signal. A shift register 8 is arranged to shift the pulse signal output from the comparator 7 by 11.25 degrees at a time. The pulse signals thus produced by the shift register 8 are applied via the data selector 13 to the phase comparator 9.

With the embodiment arranged as described above, frequency voltages which have a 90 degree phase difference from each other are respectively applied to the A phase electrode 5a and the B phase electrode 5b of the vibratory-wave motor. An edge trigger type phase comparator 18 is arranged to receive at one input terminal thereof the output of the oscillator (VCO) 12 supplied via the phase shifter 10. To the other input terminal of the phase comparator 18 is supplied the output of a 1/N times frequency dividing circuit 20 (or a 1/32 times frequency dividing circuit). Another voltage-controlled oscillator (VCO) 11 is arranged to generate a frequency which corresponds to an input signal supplied via a lag-lead filter 19 from the phase comparator 18. When there is no difference in phase between the two input signals of the phase comparator 18, the phase comparator 18 is in an open state to keep the output of the VCO 11 unchanged. When a phase difference arises between the two input signals, the phase comparator 18 produces a signal which varies in duty and polarity according to the direction and degree of the phase difference. In the latter case, the output frequency of the VCO 11 increases or decreases according to this signal.

Such being the arrangement, the two input signals of the phase comparator 18 are controlled to have them in phase. As a result, the output of the frequency dividing circuit 20 becomes in phase with, and comes to have the same frequency as, the output of the VCO 12. Therefore, the output of the VCO 11 becomes a signal of a frequency which is N times (32 times) as high as the output frequency of the VCO 12. Since the signal output from the VCO 11 is used as a clock signal to be supplied to the shift register 8, the output of the shift register 8 obtained at the eighth step (=32/4) thereof becomes a signal the phase of which differs 90 degrees from the output of the comparator 7, i.e., the output of the VCO 12.

Further, a reference numeral 6 denotes a comparator which is arranged to shape a signal output from a sensor phase (S phase) electrode 5s of the vibratory-wave motor into a rectangular pulse signal. The switch 2 mentioned in the foregoing is a detection switch which detects that the hand of the photographer has come to touch the operation part of a range ring. The torque setting switch 3 mentioned in the foregoing is arranged to set a load torque when the range ring is operated and to transmit information on the setting value of the load torque to the microcomputer 4. The phase comparator 9 is arranged to compare the phase of a signal output from the comparator 6 with the phase of a signal which is selected by the data selector 13 from among signals obtained through the shifting operation of the shift register 8 performed on a signal produced by the comparator 7. A signal obtained as a result of such comparison is then supplied from the comparator 9 to the microcomputer 4. The microcomputer 4 instructs the data selector 13 to select a value which is obtained from the output signal of the comparator 7 and which is shifted by the shift register 8 according to the clock signal of a frequency which is N times as high as the output frequency of the VCO 12.

In the case of this specific embodiment, the frequency dividing circuit 20 is arranged to divide a frequency by N (=32). Therefore, the shift register 8 produces at every operation step thereof an output which is obtained by shifting 11.25 (=360/32) degrees the signal wave form of the A phase. Then, any one of the signals thus output from the shift register 8 is selected as desired by means of the data selector 13.

Further, the phase comparator 9 is arranged in the same manner as the phase comparator 18. The phase comparator 9 is in an open state when there is no phase difference between the two input signals thereof. When a phase difference arises between the two input signals, the phase comparator 9 produces a pulse signal the duty and the polarity of which vary according to the direction and degree of the phase difference between the two input signals.

The free-running frequency setting device 21 is arranged to change the oscillation frequency of the voltage-controlled oscillator (VCO) 12 in accordance with the instruction of the microcomputer 4. The phase shifter 10 is arranged to supply, also in accordance with the instruction of the microcomputer 4, the signal of the VCO 12 directly to the amplifier 14 which is provided for the A phase and to the amplifier 15 for the B phase after the phase of the signal is shifted 90 degrees. The phase shifter 10 includes output gates which are arranged to turn on and off the two outputs thereof.

Figure 4:
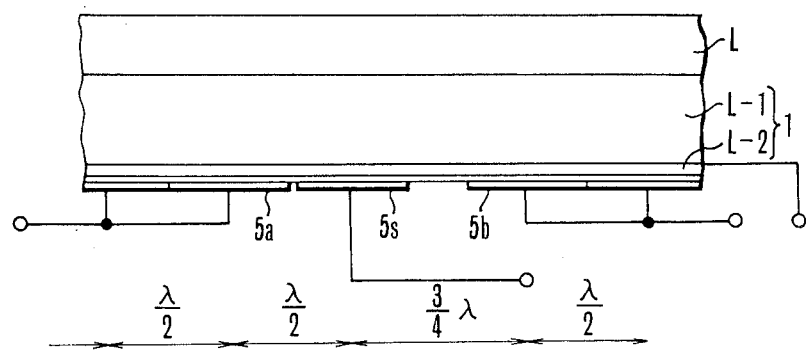
FIG. 4 is a sectional view of a motor shown in FIG. 1.

FIG. 4 is a sectional view showing the vibratory-wave motor of FIG. 1 as viewed from the direction of the circumference thereof. Referring to FIG. 4, the motor is provided with a rotor L; a vibrating body L-1; a piezoelectric body L-2 which is disposed on the vibrating body L-1 and has undergone a polarizing treatment; and the electrodes 5a, 5b and 5c which are shown in FIG. 1. The vibrating body L-1 and the piezoelectric body L-2 jointly form a stator 1. The rotor L is in frictional contact with the surface of the vibrating body L-1.

Assuming that the wave length of a windingly progressive wave which is obtained at the vibrating body L-1 is $\lambda$, the A phase electrode 5a is a driving electrode disposed on the piezoelectric body L-2 at a an interval of $\lambda/2$. The B phase electrode 5b is a driving electrode which is also disposed on the piezoelectric body L-2 at an interval of $\lambda/2$. The S phase electrode 5s is a vibration detecting electrode. The positional phase of the A phase electrode 5a differ as much as $\lambda/2$ from that of the S phase electrode 5s. In other words, these electrodes 5a and 5s are in phase. The positional phase of the B phase electrode 5b and that of the A phase electrode 5a differ from each other as much as $3\lambda/4$. A piezoelectric body of A phase is formed by a piezoelectric body on which a driving voltage is impressed by means of the A phase electrode 5a. Meanwhile, a piezoelectric body of B phase is formed by a piezoelectric body on which a driving voltage is impressed by means of the B phase electrode 5b.

Figure 2:
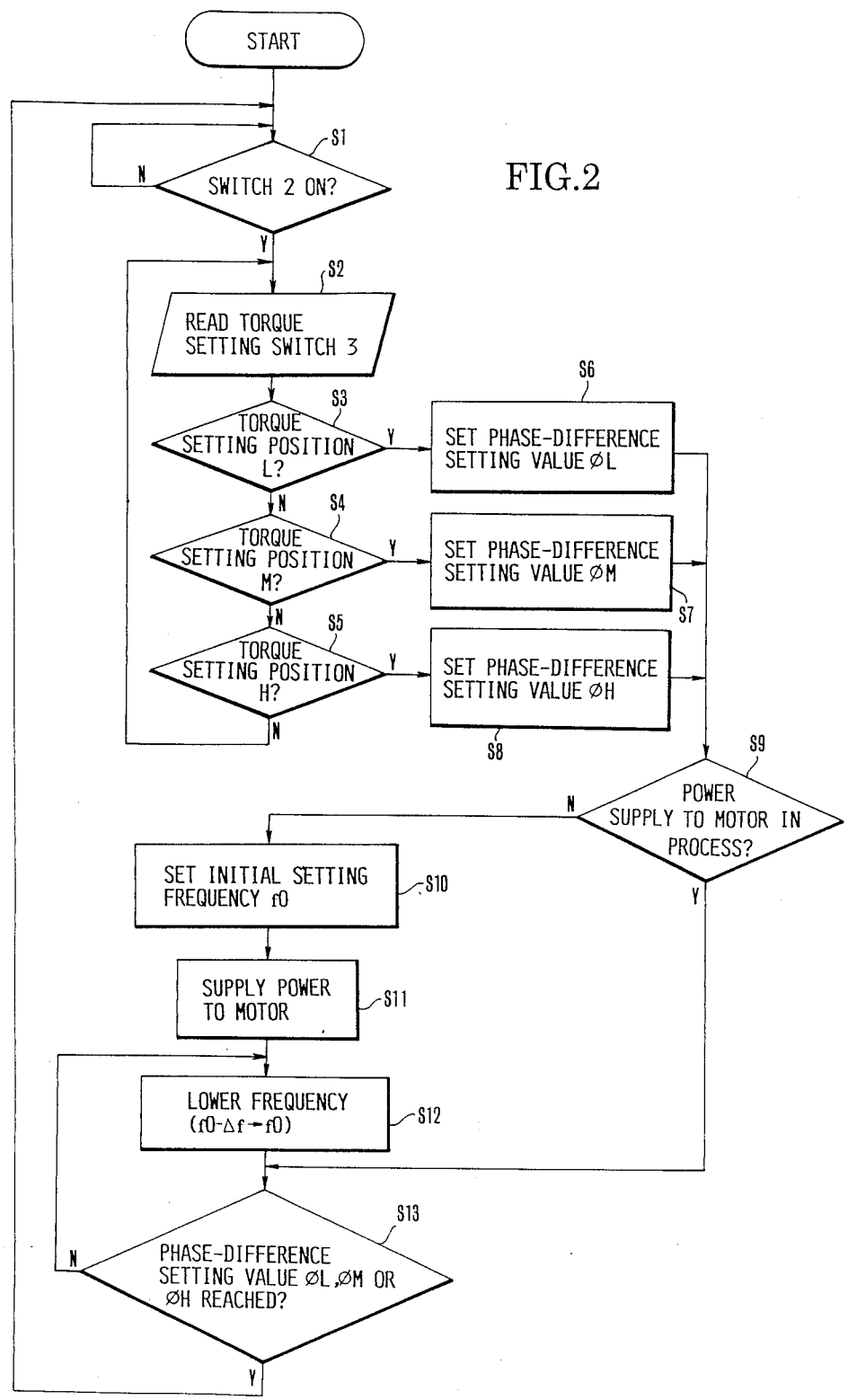
FIG. 2 is a flow chart showing the programmed operation of the circuit shown in FIG. 1.

Referring now to the program shown in FIG. 2, the operation of the circuit arranged as shown in FIG. 1 is as follows: This program is assumed to be provided within the microcomputer 4 and to start when a power supply switch which is not shown is turned on. Further, the free-running frequency f0 of the voltage-controlled oscillator (VCO) 12 is assumed to be sufficiently higher than the mechanical resonance frequency fr of the vibratory-wave motor and to be set at a value lower than $$\frac{fr \times (n + 1)^2}{n^2}$$

(wherein n represents the number of vibratory waves generated at the vibratory-wave motor).

At a step S1: With the program started, the position of the switch 2 is read. If the switch 2 is found to be on, the flow of the program proceeds to steps S2 to S8. At the steps S2 to S8: The position of the torque setting switch 3 is read. Then, one of phase-difference setting values $\phi L$, $\phi M$ and $\phi H$ is set according to the setting position L, M or H of the torque setting switch 3. After that, the flow proceeds to a step S9 to make a check for a power supply to the motor. If the motor is found to be not receiving the power supply, the flow comes to a step S10 to have an initial setting frequency f0 set by the free-running frequency setting device 21. Then, at a next step S11, a power supply is effected to the motor. The power supply action on the motor is performed by transmitting to the amplifier 14 via the phase shifter 10 the signal of the frequency f0 which is produced by the VCO 12 in accordance with the output of the free-running frequency setting device 21. At this instance, the phase shifting degree of the phase shifter 10 is zero. In other words, in performing the power supply action, the output gate of the phase shifter 10 which is connected to the amplifier 14 is alone turned on while the other output gate which is connected to the other amplifier 15 remains off. This allows the output signal of the VCO 12 to be transmitted via the amplifier 14 to the electrod 5a. As a result, a stationary wave is formed on the stator 1.

At a step S12: The frequency f0 which has been set by the setting device 21 is lowered by a given degree $\Delta f$. At a step S13: A check is made to find if the phase difference between the signal from the electrode 5s and the signal from the electrode 5a has reached the phase-difference setting value $\phi L$, $\phi M$ or $\phi H$. This finding (determining) action is performed in the following manner: In accordance with the phase-difference setting value $\phi L$, $\phi M$ or $\phi H$ set at the step S6, S7 or S8, the data selector 13 selects one of the output steps of the shift register 8. For example, when the setting value $\phi L$ has been set, the data selector 13 selects the output of the eighth step of the shift register 8. When the setting value $\phi M$ has been set, the data selector 13 selects the output of the fifth step of the shift register 8. When the setting value $\phi H$ has been set, the data selector 13 selects the output of the third step of the shift register 8.

Therefore, when the phase-difference setting value $\phi L$ has been set, the data selector 13 produces a signal which is phase-shifted by 90 degrees from the phase of the signal supplied to the electrode 5a. When the phase-difference setting value $\phi M$ has been set, the data selector 13 produces a signal which is phase-shifted by 56.25 degrees. In the event of the phase-difference setting value $\phi H$, the data selector 13 produces a signal which is phase-shifted by 33.75 degrees. As mentioned in the foregoing, the phase comparator 9 is in an open state if there is no phase difference between the two input signals thereof. Therefore, if the phase-difference setting value $\phi L$, for example, has been set, the open state of the phase comparator 9 takes place when a phase difference between the signals of the electrodes 5s and 5a is 90 degrees. Further, the open state of the phase comparator 9 takes place when the phase difference between the signals of the electrodes 5s and 5a is 57.25 degrees if the phase-difference setting value $\phi M$ has been set and when the phase difference between these signals is 33.75 degrees if the phase-difference setting value $\phi H$ has been set. With a check made at the step S13 to find if the phase comparator 9 is in an open state, if the phase comparator 9 is found to be in the open sate, the flow comes to the step S1.

The step S12 is repeatedly executed until detection of the open state of the phase comparator 9 at the step S13. Therefore, the frequency of the output of the voltage-controlled oscillator (VCO) 12 is thus lowered from the initial setting frequency f0 to a frequency fL, fM or fH at which the phase difference between the A phase and the S phase (a phase difference between the signals of the electrodes 5a and 5s) reaches the phase-difference setting value $\phi L$, $\phi M$ or $\phi H$. These phase difference values and the frequency values are obtained through experiments. They are shown in FIG. 3.

Figure 3:
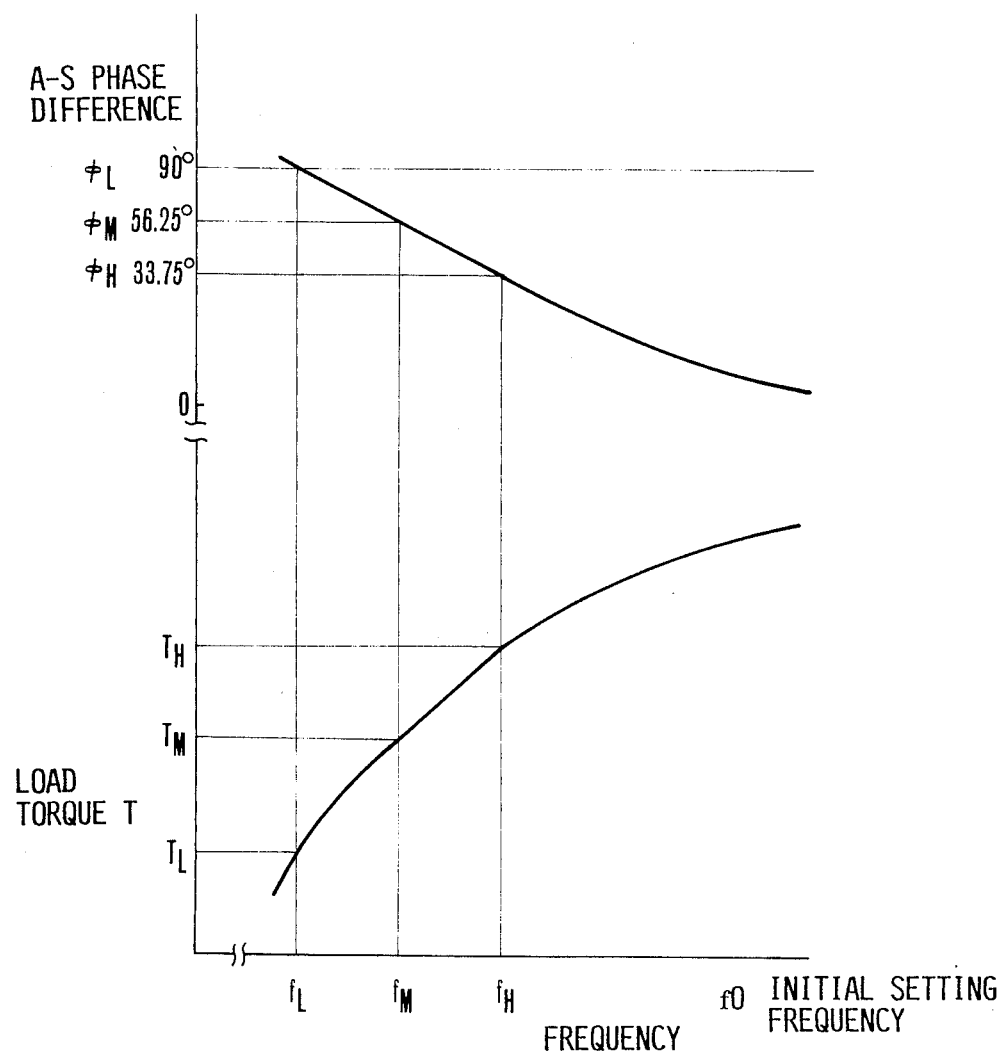
FIG. 3 is a graph showing a driving frequency and a load torque in relation to a phase difference.

Referring to FIG. 3, a load torque T is reduced to torque values TH, TM and TL accordingly as the frequency lowers from fH to fM and fL. When the torque setting switch 3 is set at its position H, the load torque T becomes the torque TH which is relatively heavy. When the switch 3 is shifted to another position L, the load torque T becomes a torque TL which is relatively light.

With the embodiment arranged as described above, the torque on the rotor L can be set at a desired value when the stationary wave is formed at the stator 1. Therefore, the embodiment enables a manual lens driving operation to be lightly carried out.

Figure 5:
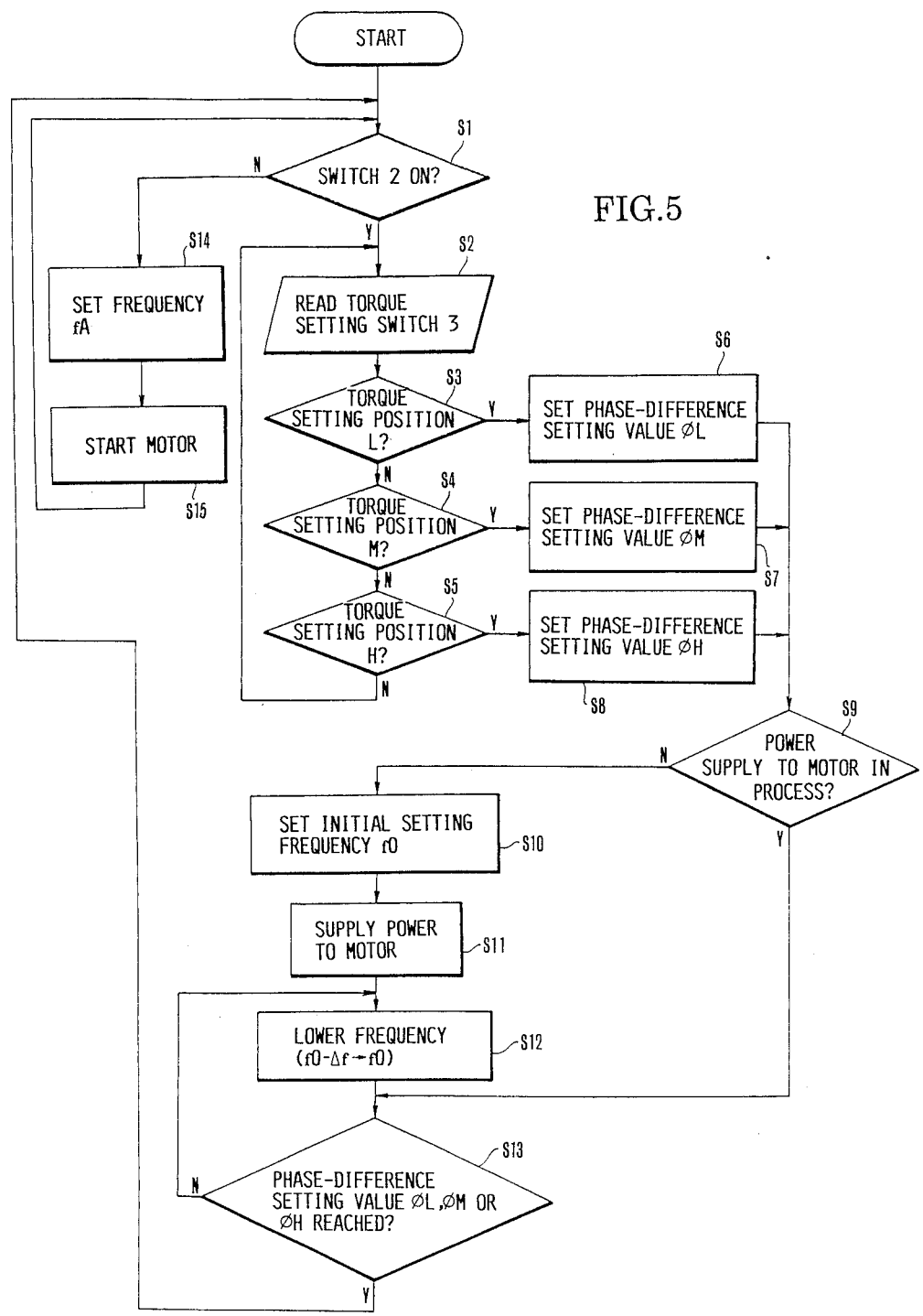
FIG. 5 is a flow chart showing the programmed operation of another embodiment of the invention.

FIG. 5 is a program flow chart showing the operation of another embodiment of the invention. The flow chart includes some steps in addition to the steps of the flow chart shown in FIG. 2. In FIG. 5, steps S1 to S13 are identical with those of the flow of FIG. 2 and, therefore, details of these steps are omitted from the following description:

Referring to FIG. 5, when an on-state of the switch 2 is not detected at the step S1, the flow comes to a step S14. At the step S14: The free-running frequency setting device 21 is caused to set a given frequency fA. Then, the voltage-controlled oscillator 12 is caused to produce a frequency signal of the frequency fA. At a step S15: The motor is started. In starting the motor at the step S15, the output gate of the phase shifter 10 which is disposed at a connection node between the phase shifter 10 and the amplifiers 14 and 15 is turned on. Then, the output of the voltagecontrolled oscillator 12 is transmitted to the amplifier 14 as it is. Meanwhile, to the other amplifier 15 is transmitted a signal which is obtained by phase-shifting 90 degrees the output of the voltage-controlled oscillator 12. As a result of this, a progressive vibratory wave is formed at the motor to have the rotor L driven by this vibratory wave.

In the embodiment, the piezoelectric body may be replaced with an electrostrictive element.

Figure 6:
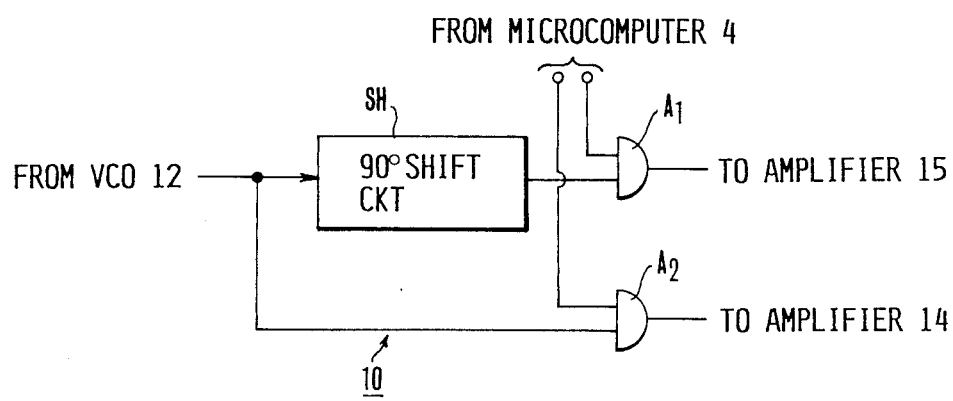
FIG. 6 is a circuit diagram showing the arrangement of a phase shifter 10 which is included in FIG. 1.

Further, the arrangement of the phase shifter 10 is as shown in FIG. 6. Referring to FIG. 6, there are provided a 90 degree shift circuit SH and AND gates A1 and A2 which serve as the output gates of the phase shifter 10. In effecting a power supply to the motor at the step S11, the gate A1 is turned off and the gate A2 is turned on. In starting the motor at the step S15, both the gates A1 and A2 are turned on.

What is claimed is:

1. A vibratory-wave motor device having a first mode in which a vibratory wave is formed by applying frequency signals of different phases to first and second electro-mechanical energy converting parts, respectively, which are disposed at different positions on a first structural member and a second mode in which a standing wave is formed by applying a frequency signal to said first electro-mechanical energy converting part, comprising:
   an adjustment circuit arranged to variably adjust the frequency of said frequency signal in said second mode;
   monitor means for monitoring a driven state of said motor device; and
   setting means for setting a predetermined setting value;
   wherein said adjustment circuit is arranged to adjust said frequency in accordance with an output of said monitor means and a setting value set by said setting means such that the output of said monitor means comes into a state corresponding to said setting value.

2. A device according to claim 1, wherein said monitor means monitors the driven state of said motor device by monitoring said first electro-mechanical energy converting part.

3. A device according to claim 1, wherein said adjustment circuit is arranged to detect a phase difference between said frequency signal and the output of said monitor means and to adjust said frequency such that said phase difference reaches a value corresponding to said setting value.

4. A device according to claim 3, wherein said first and second electro-mechanical energy converting parts are piezoelectric bodies.

5. A device according to claim 3, wherein said first and second electro-mechanical energy converting parts are electrostrictive elements.

6. A vibratory-wave motor device arranged to form a standing wave by applying a frequency signal to an electro-mechanical energy converting part on a first structural member, comprising:

an adjustment circuit arranged to adjust the frequency of said frequency signal so as to adjust a contact force between said first structural member and a second structural member which is in contact with said first structural member;

monitor means for monitoring a driven state of said motor device; and setting means for setting a predetermined setting value;

wherein said adjustment circuit is arranged to adjust said frequency in accordance with an output of said monitor means and a setting value set by said setting means such that the output of said monitor means comes into a state corresponding to said setting value.

7. A device according to claim 6, wherein said monitor means monitors the drive state of said motor device by monitoring said electro-mechanical energy converting part.

8. A device according to claim 6, wherein said adjustment circuit is arranged to detect a phase difference between said frequency signal and the output of said monitor means and to adjust said frequency such that said phase difference reaches a value corresponding to said setting value.

9. A device according to claim 8, wherein said electro-mechanical energy converting part is a piezoelectric body.

10. A device according to claim 8, wherein said electro-mechanical energy converting part is an electrostrictive element.

* * * * *